(12) United States Patent
Harris et al.

(10) Patent No.: US 8,612,533 B1
(45) Date of Patent: Dec. 17, 2013

(54) SYSTEM AND METHOD FOR CREATING AND MANAGING GEOFEEDS

(71) Applicants: Philip B. Harris, Naples, FL (US); Scott K. Mitchell, Naples, FL (US); Michael J. Mulroy, Glencoe, IL (US)

(72) Inventors: Philip B. Harris, Naples, FL (US); Scott K. Mitchell, Naples, FL (US); Michael J. Mulroy, Glencoe, IL (US)

(73) Assignee: Geofeedr, Inc., Naples, FL (US)

( * ) Notice: Subject to any disclaimer, the term of this patent is extended or adjusted under 35 U.S.C. 154(b) by 0 days.

(21) Appl. No.: 13/788,760

(22) Filed: Mar. 7, 2013

(51) Int. Cl.
*G06F 15/16* (2006.01)
*G06F 7/00* (2006.01)

(52) U.S. Cl.
USPC ........... 709/206; 709/204; 709/207; 709/217; 709/218; 707/748; 707/723; 707/776; 707/769; 707/732; 715/849; 715/751; 715/739; 715/764

(58) Field of Classification Search
USPC .......................... 709/206, 217, 204, 207, 218
See application file for complete search history.

(56) References Cited

U.S. PATENT DOCUMENTS

| | | | |
|---|---|---|---|
| 6,363,320 B1 | 3/2002 | Chou | 701/207 |
| 7,698,336 B2 | 4/2010 | Nath | 707/737 |
| 8,103,741 B2 | 1/2012 | Frazier et al. | 709/217 |
| 8,341,223 B1 | 12/2012 | Patton et al. | 709/204 |
| 8,428,228 B1 | 4/2013 | Baxter, Jr. | 379/88.14 |
| 2002/0029226 A1 | 3/2002 | Li et al. | 707/104.1 |
| 2003/0088609 A1 | 5/2003 | Guedalia et al. | 709/107 |
| 2004/0203854 A1 | 10/2004 | Nowak | 455/456.1 |
| 2004/0225635 A1 | 11/2004 | Toyama et al. | 707/1 |
| 2005/0034074 A1 | 2/2005 | Munson et al. | 715/712 |
| 2006/0002317 A1 | 1/2006 | Punaganti Venkata | 370/310 |
| 2006/0184968 A1 | 8/2006 | Clayton et al. | 725/56 |
| 2006/0200305 A1 | 9/2006 | Sheha et al. | 701/200 |
| 2007/0112729 A1 | 5/2007 | Wiseman et al. | 707/3 |
| 2007/0143345 A1 | 6/2007 | Jones et al. | 707/104.1 |
| 2007/0210937 A1 | 9/2007 | Smith et al. | 340/995.1 |
| 2007/0276919 A1 | 11/2007 | Buchmann et al. | 709/217 |
| 2008/0092054 A1 | 4/2008 | Bhumkar et al. | 715/739 |
| 2008/0104019 A1 | 5/2008 | Nath | 707/3 |

(Continued)

FOREIGN PATENT DOCUMENTS

| | | |
|---|---|---|
| EP | 1 045 345 | 10/2000 |
| WO | WO 99/15995 | 4/1999 |
| WO | WO 2010/049918 | 5/2010 |

OTHER PUBLICATIONS

U.S. Appl. No. 13/284,455, a non-final Office Action mailed Jan. 7, 2013, 18 pages.

(Continued)

*Primary Examiner* — Jude Jean Gilles
(74) *Attorney, Agent, or Firm* — Pillsbury Winthrop Shaw Pittman LLP (57) ABSTRACT

The disclosure relates to systems and methods of burning, snapshotting, streaming and curating geofeeds, each geofeed including a plurality of geofeed content items that are aggregated from a plurality of content providers using respective requests formatted specifically for individual ones of the plurality of content providers, where each individual set of a plurality of content is relevant to one or more geographically definable locations. Archives of a geofeed may be generated by burning portions or all of the geofeed content items and/or generating snapshots of geofeeds at different times. A real-time geofeed may be streamed by continuously or periodically obtaining newly available geofeed content items and updated a geofeed stream in real-time. Collections of geofeed content items may be curated in order to organize and follow geofeed content items of interest.

21 Claims, 8 Drawing Sheets

(56) References Cited

U.S. PATENT DOCUMENTS

| | | | |
|---|---|---|---|
| 2008/0192934 A1* | 8/2008 | Nelger et al. | 380/258 |
| 2008/0250031 A1* | 10/2008 | Ting et al. | 707/100 |
| 2009/0005968 A1 | 1/2009 | Vengroff et al. | 701/202 |
| 2009/0132435 A1 | 5/2009 | Titus et al. | 705/400 |
| 2009/0138497 A1 | 5/2009 | Zavoli et al. | 707/102 |
| 2009/0300528 A1 | 12/2009 | Stambaugh | 715/764 |
| 2010/0076968 A1 | 3/2010 | Boyns et al. | 707/732 |
| 2010/0145947 A1 | 6/2010 | Kolman et al. | 707/736 |
| 2010/0153386 A1 | 6/2010 | Tysowski | 707/736 |
| 2010/0153410 A1 | 6/2010 | Jin et al. | 707/758 |
| 2011/0007941 A1 | 1/2011 | Chen et al. | 382/103 |
| 2011/0010674 A1 | 1/2011 | Knize et al. | 715/849 |
| 2011/0078584 A1 | 3/2011 | Winterstein et al. | 715/751 |
| 2011/0113096 A1 | 5/2011 | Long et al. | 709/204 |
| 2011/0123066 A9 | 5/2011 | Chen et al. | 382/103 |
| 2011/0131496 A1 | 6/2011 | Abram et al. | 715/722 |
| 2011/0142347 A1 | 6/2011 | Chen et al. | 382/190 |
| 2011/0288917 A1 | 11/2011 | Wanek et al. | 705/14.5 |
| 2012/0001938 A1 | 1/2012 | Sandberg | 345/633 |
| 2012/0047219 A1 | 2/2012 | Feng et al. | 709/207 |
| 2012/0078503 A1 | 3/2012 | Dzubay et al. | 701/410 |
| 2012/0084323 A1 | 4/2012 | Epshtein et al. | 707/776 |
| 2012/0150901 A1 | 6/2012 | Johnson et al. | 707/769 |
| 2012/0166367 A1 | 6/2012 | Murdock et al. | 706/12 |
| 2012/0221687 A1 | 8/2012 | Hunter et al. | 709/219 |
| 2012/0276848 A1 | 11/2012 | Krattiger et al. | 455/41.2 |
| 2012/0276918 A1 | 11/2012 | Krattiger et al. | 455/456.1 |
| 2013/0018957 A1 | 1/2013 | Parnaby et al. | 709/204 |
| 2013/0073388 A1 | 3/2013 | Heath | 705/14.53 |
| 2013/0110631 A1* | 5/2013 | Mitchell et al. | 705/14.58 |
| 2013/0159463 A1 | 6/2013 | Bentley et al. | 709/217 |

OTHER PUBLICATIONS

U.S. Appl. No. 13/619,888, a non-final Office Action mailed Mar. 1, 2013, 15 pages.

U.S. Appl. No. 13/708,466, a non-final Office Action mailed Apr. 17, 2013, 15 pages.

U.S. Appl. No. 13/708,516, a non-final Office Action mailed May 15, 2013, 11 pages.

U.S. Appl. No. 13/708,404, a Notice of Allowance mailed May 24, 2013, 12 pages.

Chow et al., "Towards Location-Based Social Networking Services", *LBSN 2010 Proceedings of the 2nd ACM SIGSPATIAL International Workshop on Location Based Social Networks*, Nov. 2, 2010, pp. 31-38.

Bao, Jie, et al., "GeoFeed: A Location-Aware News Feed System", *IEEE Xplore® Digital Library*, Published in *2012 IEEE 28TH International Conference on Data Engineering*, Apr. 1-5, 2012, 14 pages.

Sarwat, Mohamed, et aL, "Sindbad: A Location-Based Social Networking System", *SIGMOD '12*, Scottsdale, Arizona, May 20-24, 2012, 4 pages.

U.S. Appl. No. 13/284,455, a non-final Office Action, mailed Jun. 4, 2013, 28 pages.

U.S. Appl. No. 13/708,516, a Notice of Allowance, mailed Jun. 7, 2013, 14 pages.

U.S. Appl. No. 13/619,888, a Notice of Allowance, mailed Jul. 9, 2013, 10 pages.

U.S. Appl. No. 13/788,843, a non-final Office Action, mailed Aug. 5, 2013, 17 pages.

U.S. Appl. No. 13/788,909, a non-final Office Action, mailed Aug. 12, 2013, 17 pages.

U.S. Appl. No. 13/843,949, a non-final Office Action, mailed Aug. 29, 2013, 12 pages.

U.S. Appl. No. 13/708,466, a Notice of Allowance, mailed Sep. 3, 2013, 11 pages.

U.S. Appl. No. 13/843,832, a non-final Office Action, mailed Sep. 13, 2013, 12 pages.

U.S. Appl. No. 13/284,455, a Notice of Allowance, mailed Oct. 4, 2013, 17 pages.

Amitay et al, "Web-a-Where: Geotagging Web Content", Proceedings of the 27th Annual International ACM SIGIR Conference on Research and Development in Information Retrieval (SIGIR), 2004, pp. 273-280.

\* cited by examiner

SYSTEM AND METHOD FOR CREATING AND MANAGING GEOFEEDS

FIELD OF THE INVENTION

The disclosure relates to systems and methods for creating, managing, and curating geofeeds, including content related to geographically definable locations that is aggregated from a plurality of social media or other content providers.

BACKGROUND OF THE INVENTION

The availability of content such as videos, audio files, photos, text, and/or other content over networks such as the Internet has grown at impressive rates. Many Internet and other online service providers make this type of content available to enable users to post and share such content through their services. However, various limitations exist with respect to how this vast amount of information can be effectively monitored and/or selectively displayed.

At various times, different content providers may no longer host certain content and/or may be experiencing scheduled or unscheduled downtime. In these instances, content that was previously available may no longer be available. In addition, historical views of such content may not be possible when content that was once available is no longer made available.

Furthermore, real-time updates of content that are relevant to geographically definable locations ("geo-locations") and aggregated from various content providers may be difficult to obtain. Another problem arises when attempting to curate the content to follow or track events or items of interest.

These and other problems exist.

SUMMARY OF THE INVENTION

The disclosure relates to systems and methods of creating, managing, and curating geofeeds. A geofeed may include content that is aggregated from a plurality of content providers using respective requests formatted specifically for individual ones of the plurality of content providers, where an individual set of a plurality of content is relevant to one or more geo-locations.

In some embodiments, the system may include a computer that facilitates creation, management, and curation of geofeeds. The computer may include one or more processors configured to perform some or all of a functionality of a plurality of modules. For example, the one or more processors may be configured to execute a geofeed creation module, an archive module, a geofeed streamer module, a curator module, an administration module, a communication module, a user interface module, and/or other modules.

The geofeed creation module may be configured to receive a request to create a geofeed based on a specification of one or more geo-locations. The request may include one or more geofeed parameters, one or more management parameters and/or other parameters. The one or geofeed parameters may be used to filter content into the geofeed and/or out of the geofeed. The management parameters may specify whether and/or how various management functions should be performed in relation to the geofeed. The management functions may include, for example, storing content of the geofeed or information related to the content of the geofeed, generating a snapshot of the geofeed, streaming the geofeed, and/or other management functions.

The geofeed creation module may generate a geofeed definition that includes the specification of the one or more geo-locations, the one or more geofeed parameters, the one or more management parameters, and/or other information related to the geofeed. The geofeed definition may be updated. For example, the specification of the one or more geo-locations, the one or more geofeed parameters, the one or more management parameters, and/or other information of the geofeed definition may be updated. In this manner, various parameters related to geofeeds may be defined or updated at the time of specifying the geofeeds and/or after the geofeeds have been specified.

To create the geofeed, the geofeed creation module may obtain the specification of the one or more geo-locations from the geofeed definition and generate requests that specify the one or more geo-locations specifically for individual ones of the plurality of content providers. In some embodiments, the geofeed creation module may create a single geofeed having a plurality of geo-locations that are grouped with respect to one another. In other embodiments, the geofeed creation module may create multiple distinct geofeeds, which may each be associated with one or more geo-locations that are grouped with respect to one another. In these embodiments, each set of individual content may correspond to a single geofeed.

In some embodiments, various modules may be configured to manage geofeeds that have been created based on the geofeed management parameters. For example, based on various management parameters, the archive module may be configured to burn a geofeed and/or generate geofeed snapshots and the geofeed streamer module may be configured to stream a geofeed.

In some embodiments, the management parameters may include one or more content storage parameters that specify whether and how the content of a geofeed should be stored. The archive module may be configured to store the content of the geofeed such as an actual TWEET or information related to the content of the geofeed such as a link that is parsed from the actual TWEET based on the content storage parameters. In this manner, even if a content provider is experiencing downtime (e.g., cannot process requests for content) or is otherwise unavailable, the system may retrieve the content and/or information related to the content from a memory, to the extent allowable by law and/or terms of service from the content provider.

In some embodiments, the archive module may be configured to store the content or information related to the content of a geofeed at predefined intervals such as, for example, at weekly, daily, hourly, and/or other intervals. Thus, the stored content and/or information related to the content may be updated periodically in order to obtain and store newly available content.

In some embodiments, the archive module may be configured to receive from a content consumer or other user a content storage request that identifies a geofeed for which to store the content or information related to the content.

In some embodiments, the archive module may automatically determine one or more geo-locations for a geofeed for which the content or information related to the content should be stored. For example, the archive module may determine that content relevant to geo-locations that may be popular should be stored based on the popularity (and/or other characteristic) of the geo-locations.

In some embodiments, a geofeed for which the content and/or information related to the content has been stored may be used to at least partially provide content that may satisfy a request for another geofeed. For example, a request for a geofeed for a city for which a geofeed has already been created may cause at least some of the content from the previously created geofeed to be included as part of the geofeed that is responsive to the request. In another example, a request for a geofeed related to a particular location in a city for which a geofeed has already been created may cause at least some of the content from the already created geofeed that is relevant to the particular location to be included as part of the geofeed that is responsive to the request.

In some embodiments, the management parameters may include one or more geofeed snapshot parameters that specify whether and how a geofeed snapshot should be generated. The archive module may be configured to generate a geofeed snapshot based on the geofeed snapshot parameters. A geofeed snapshot may include a geofeed that is created at a particular time and stored in relation to the particular time. The archive module may create a geofeed snapshot at pre-defined and configurable intervals, which may be specified by the one or more geofeed snapshot parameters. In this manner, the archive module may provide a landscape of social media and/or other content that is relevant to a geo-location at various times.

In some embodiments, the management parameters may include one or more geofeed stream parameters that specify whether and how a geofeed should be streamed. In some embodiments, the geofeed streamer module may be configured to stream a geofeed based on the one or more geofeed stream parameters. The geofeed streamer module may stream a geofeed by periodically or continuously obtaining geofeed content based on the one or more geofeed stream parameters and communicating the obtained geofeed content as a geofeed stream using various conventional data streaming techniques.

In some embodiments, the geofeed streamer module may be configured to obtain newly added content so that the geofeed stream remains up-to-date with recent content. For example, the geofeed streamer module may obtain content that was newly published or otherwise provided by content providers since the last time that the geofeed streamer module requested such content from the content providers.

In some embodiments, the curator module may be configured to curate the content of one or more geofeeds. The curator module may tag certain geofeed content within a geofeed with various collection identifiers that classify the geofeed content. The curator module may receive collection identifiers from a user to allow the user to label certain geofeed content. In some embodiments, the curator module may use the collection identifiers to selectively display the labeled content. For example, a user may view a geofeed and label particular geofeed content of the geofeed with a collection identifier that allows the user to later recall the geofeed content based on the collection identifier.

In some embodiments, the administration module may be configured to manage user accounts, set user roles such as security access roles, and/or perform other administrative operations. For example, the administration module may be used to set which user may access different views, curate geofeeds, view and manage curated content, decide whether to burn a geofeed such as by storing content or information related to the content, and/or provide other security roles.

In some embodiments, the communication module may be configured to share a geofeed via a content provider such as a social media provider, email, SMS text, and/or other communication channels. In some embodiments, the communication module may be configured to communicate a geofeed via various feeds such as Really Simple Syndication ("RSS") and ATOM feeds, a vanity Uniform Resource Locator ("URL") using a name of the geofeed (e.g., a name assigned by the content consumer), and/or other communication channels.

In some embodiments, the user interface module may be configured to generate user interfaces related to the geofeeds. For example, the user interface module may present various displays for requesting, managing, curating, displaying, and/or otherwise displaying information related to geofeeds.

The user interface module may generate various interfaces for specifying a new geofeed. For example, a geofeed request user interface may receive a specification of the one or more geo-locations, one or more geofeed parameters, one or more management parameters, and/or other information related to the geofeed. The geofeed request user interface may cause a geofeed definition to be created and/or the specified geofeed to be generated and displayed.

The user interface module may generate various interfaces for managing geofeeds. For example, a geofeed management user interface may receive updates to the specification of the one or more geo-locations, the one or more geofeed parameters, the one or more management parameters, and/or other information related to the geofeed.

The user interface module may generate various interfaces for curating geofeeds. For example, a curation user interface may receive one or more selections of content included in one or more geofeeds and associate the one or more selections with a collection identifier. In this manner, a user may curate geofeeds by grouping particular content of interest with one another.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
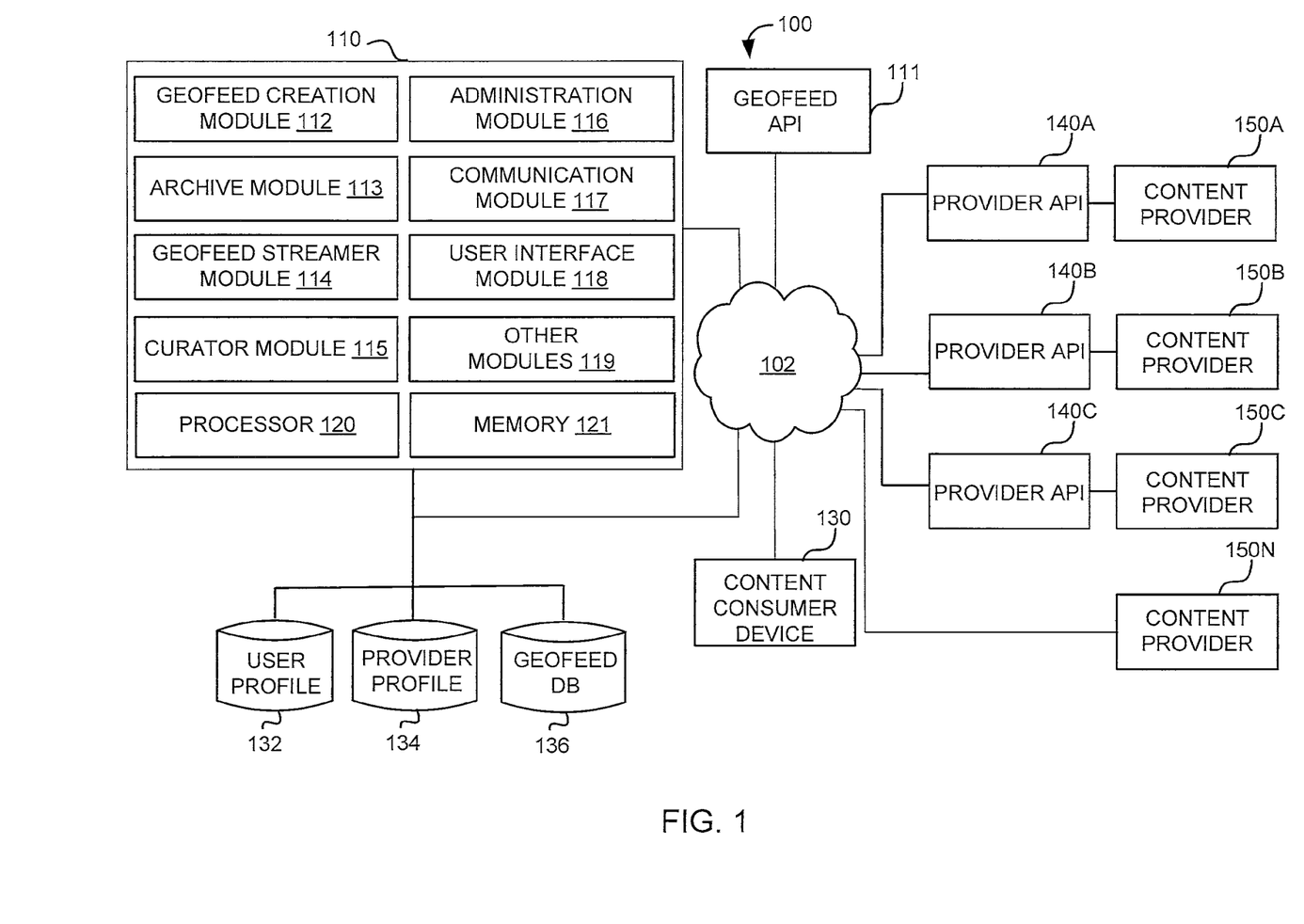
FIG. 1 illustrates a system of creating and managing geofeeds, according to an aspect of the invention.

FIG. 1 illustrates a system 100 of creating and managing geofeeds, according to an aspect of the invention. A geofeed includes a collection of content (also referred to herein as "geofeed content"), aggregated from various content providers, that is relevant to a geographically definable location (hereinafter, a "geo-location"). The content providers may include, for example, social media platforms (e.g., FACEBOOK, TWITTER, INSTAGRAM, FLICKR, etc.), online knowledge databases, and/or other providers that can distribute content that may be relevant to a geo-location. The geo-location may be specified by a boundary, geo coordinates (e.g., latitude, longitude, altitude/depth), an address, a school, a place name, a point of interest, a zip code, a city, a state, a country, and/or other information that can spatially identify an area. The content may be generated by content sources such as individuals, corporations, and/or other entities that may create content. As used hereinafter, "a location," "a geo-location," "a geographically definable location," and similar language is not limited to a single location but may also refer to one or more such locations.

In many instances the content can be automatically tagged with information. The information may include a user identification, date/time information related to the content (e.g., a date and/or time that indicates when the content was created, uploaded, etc.), geographic information that specifies a location where the content was created, uploaded, etc., and/or other information. For example, cameras equipped with a Global Positioning Satellite ("GPS") unit and/or other location-aware system may embed into an image file latitude/longitude coordinates that indicate where a picture was taken. In addition, modern hand-held devices such as smartphones may be equipped with a GPS sensor, which allows users to generate content with their devices and share the content through a plurality of social networks and other providers. Moreover, some devices allow users to manually input the foregoing and other information for embedding into the content. Furthermore, editing software may allow a user to embed or otherwise manually and/or automatically include information along with the content after the content was created.

System 100 may include a computer 110, a geofeed API 111, a content consumer device 130, provider APIs 140, content providers 150, and/or other components. In some embodiments, computer 110 may include one or more processors 120 configured to perform some or all of a functionality of a plurality of modules, which may be stored in a memory 121. For example, the one or more processors 120 may be configured to execute a geofeed creation module 112, an archive module 113, a geofeed streamer module 114, a curator module 115, an administration module 116, a communication module 117, a user interface module 118, and/or other modules 119.

Geofeed creation module 112 may be configured to create one or more geofeeds, as described in U.S. patent application Ser. No. 13/284,455, filed Oct. 28, 2011, entitled "SYSTEM AND METHOD FOR AGGREGATING AND DISTRIBUTING GEOTAGGED CONTENT," and U.S. patent application Ser. No. 13/619,888, filed Sep. 14, 2012, entitled "SYSTEM AND METHOD FOR GENERATING, ACCESSING, AND UPDATING GEOFEEDS" both of which are incorporated by reference herein in their entireties.

Co-pending U.S. patent application Ser. No. 13/788,843, filed concurrently herewith, entitled "SYSTEM AND METHOD FOR DIFFERENTIALLY PROCESSING A LOCATION INPUT FOR CONTENT PROVIDERS THAT USE DIFFERENT LOCATION INPUT FORMATS," and co-pending U.S. patent application Ser. No. 13/788,909, filed concurrently herewith, entitled "SYSTEM AND METHOD FOR TARGETED MESSAGING, WORKFLOW MANAGEMENT, AND DIGITAL RIGHTS MANAGEMENT FOR GEOFEEDS," Ser. No. 13/788,909, are all incorporated by reference in their entireties herein.

Co-pending U.S. patent application Ser. No. 13/708,516, filed Dec. 7, 2012, entitled "SYSTEM AND METHOD FOR LOCATION MONITORING BASED ON ORGANIZED GEOFEEDS," U.S. patent application Ser. No. 13/708,404 (issued on Jul. 9, 2013 as U.S. Pat. No. 8,484,224), filed Dec. 7, 2012, entitled "SYSTEM AND METHOD FOR RANKING GEOFEEDS AND CONTENT WITHIN GEOFEEDS," and co-pending U.S. patent application Ser. No. 13/708,466, filed Dec. 7, 2012, entitled "SYSTEM AND METHOD FOR GENERATING AND MANAGING GEOFEED-BASED ALERTS" are all incorporated by reference in their entireties herein.

Geofeed creation module 112 may be configured to generate one or more geofeeds based on content that is relevant to one or more geographically definable locations ("geo-locations"). The geofeed creation module may format requests that specify one or more geo-locations specifically for individual ones of the plurality of content providers and aggregate the content to form a geofeed. In some embodiments, geofeed creation module 112 may create a single geofeed having a plurality of geo-locations that are grouped with respect to one another. In other embodiments, geofeed creation module 112 may create multiple distinct geofeeds, which may each be associated with one or more geo-locations and may be grouped with respect to one another. In these embodiments, each set of individual content may correspond to a single geofeed.

For example, geofeed creation module 112 may format requests to individual ones of a plurality of APIs 140 (illustrated in FIG. 1 as API 140A, 140B, . . . , 140N). The provider APIs 140 may facilitate receiving content from corresponding content providers 150 (illustrated in FIG. 1 as content providers 150A, 150B, 150C). In some embodiments, geofeed creation module 110 may format a request directly for content provider 150N without using a corresponding API. A content consumer device 130 may request and view geofeeds created by geofeed creation module 112. The formatting instructions may be stored in and recalled from a memory such as provider database 134. Preferences for creating, viewing, and/or managing information related to geofeeds may be stored in and recalled from a memory such as user profile database 132.

In some embodiments, geofeed creation module 112 may generate a geofeed definition that describes a geofeed such that a geofeed may be dynamically generated based on the geofeed definition. For example, the geofeed definition may include the geo-location specification, one or more geofeed parameters used to filter content aggregated from content providers 150, and/or other information related to the geofeed that can be used to aggregate content from various content providers. For example, the one or geofeed parameters may be used to view only particular types of content, content from particular content providers, and/or other parameter by which to filter in or out content. The geofeed definition may be identified by a geofeed identifier and stored (e.g., in database 136) for later retrieval so that a content consumer or others may select and obtain a geofeed that was previously defined.

In some embodiments, geofeed creation module 112 may store the geofeed (e.g., in database 136). For example, geofeed creation module 112 may be configured to store the geofeed by aggregating content from content providers 150 in relation to the geofeed and store the content in association with a geofeed identifier and/or a geofeed definition.

In some embodiments, archive module 113 may be configured to burn a geofeed by storing one or more aspects of geofeed content (also referred to individually as a "geofeed content item") in a memory such as geofeed database 136. The one or more aspects may include portions of the geofeed content itself and/or information that describe the geofeed content. For example, an aspect of geofeed content may include, without limitation, an external identifier for the geofeed content such as an identifier assigned by a content provider that provided the geofeed content, a publication date that indicates a date when the geofeed content was published, location coordinates such as latitude/longitude related to the geofeed content (e.g., a location where the geofeed content was created), a title of the geofeed content, a description of the geofeed content, a Uniform Resource Locator ("URL") link to a content provider that provided the geofeed content, an author name who created the geofeed content, a URL associated with the author (e.g., a URL that includes a website or email associated with the author), a source of the geofeed content (e.g., an identity of the content provider), a link to media associated with the geofeed content, a raw, unformatted result from the content provider, and/or other aspect of the geofeed content. The raw, unformatted result from the content provider may be formatted according to an exchange format that may include, without limitation, XML text, Javascript Object Notation ("JSON") text, and/or other exchange format that can convey the geofeed content.

In some embodiments, geofeed content may include one or more links to other content such as a URL link to an online news story. Archive module 113 may parse the geofeed content, extract the one or more links to other content based on the parsing, and include the one or more links in a burned geofeed. In this manner, archive module 113 may archive links to other content that exists in the geofeed content.

Even if a content provider is experiencing downtime (e.g., cannot process requests for content), the system may retrieve the one or more aspects of stored content from a memory. In this manner, archive module 113 may facilitate a cache of geofeed content that may be used to obtain the content even when a content provider 150 is unavailable to provide the content or otherwise no longer provides the content.

In some embodiments, archive module 113 may be configured to burn a geofeed at predefined intervals such as, for example, at weekly, daily, hourly, and/or other intervals. Thus, a burned geofeed may be updated periodically in order to obtain and store newly added content. The predefined intervals may be configurable such that geofeeds may be burned at different intervals based on particular needs. To keep track of when a geofeed was burned, archive module 113 may store an associated burn date such as a date in which the geofeed was burned.

Archive module 113 may be configured to initiate a geofeed burn in various ways. In some embodiments, archive module 113 may be configured to receive from a content consumer or other user a request to burn a geofeed. The request to burn a geofeed may be received in association with a request to create a geofeed and/or may identify one or more existing geofeeds. In some embodiments, archive module 113 may determine one or more geo-locations for which a geofeed should be burned. For example, archive module 113 may automatically determine that cities or other geographically definable locations that may be popular should be burned based on their popularity or other characteristic.

In some embodiments, archive module 113 may burn a geofeed based on one or more burn parameters. The burn parameters may specify parameters by which to burn the geofeed such as, without limitation, an indication of whether to burn a geofeed, an interval/frequency with which to burn the geofeed, an indication of one or more aspects of the geofeed that should be burned, filters that filter in or out types of content (e.g., photos, text, pictures, etc.) to burn, and/or other burn parameters. In some embodiments, archive module 113 may be configured to store the one or more burn parameters as part of a geofeed definition that specifies the geofeed to be burned.

In some embodiments, archive module 113 may be configured to provide at least a portion of a burned geofeed to provide content for other geofeeds whose geo-locations at least partially overlap with the burned geofeed. For example, when a request for a geofeed is made, content from a burned geofeed may be used to at least partially satisfy the request. This may be helpful when one or more content providers 150 are unavailable to provide content at the time that the request for the geofeed was made and/or other situations where it may be desirable to obtain content from a cache as opposed to live from the content providers.

In some embodiments, archive module 113 may be configured to provide at least a portion of burned geofeed content when the geo-locations for the burned geofeed substantially match the geo-locations for a requested geofeed. For example, a request for a geofeed for a city for which a geofeed has already been burned may cause at least some of the content from the burned geofeed to be included as part of the resulting geofeed that is responsive to the request.

In some embodiments, archive module 113 may be configured to provide at least a portion of burned geofeed content when the geo-locations for the burned geofeed at least partially matches the geo-locations for a requested geofeed. For example, a request for a geofeed related to a particular location in a city for which a geofeed as already been burned may cause at least some of the content from the burned geofeed that is relevant to the particular location to be included as part of the resulting geofeed.

In some embodiments, archive module 113 may be configured to generate geofeed snapshots. A geofeed snapshot may include a geofeed that is requested at a particular time and stored in relation to the particular time. For example, archive module 113 may be configured to generate a first geofeed associated with one or more particular geo-locations at a first time, store the first geofeed, generate a second geofeed associated with the one or more particular geo-locations at a second time, and store the second geofeed. In this manner, geofeed snapshots for one or more geo-locations may be generated at different times.

Archive module 113 may generate a geofeed snapshot at predefined intervals, which may be configurable. In this manner, archive module 113 may provide at various times a landscape of social media and/or other content that is relevant to geo-locations. For example, geofeed snapshots may be used to view changes in social media and other content as historical events unfold over time at relevant geo-locations. Geofeed snapshots may also be used to view social media and other content at particular instances of time at relevant geo-locations.

In some embodiments, geofeed streamer module 114 may be configured to receive a geofeed stream request, periodically or continuously obtain geofeed content based on the geofeed stream request, and communicate the obtained geofeed content as a geofeed stream to a geofeed widget executing at a client or other computing device remote from the geofeed streamer module. The geofeed stream is a set of one or more geofeed content items that may be periodically or continuously updated (e.g., added to or replaced with new geofeed content items) and communicated for display.

In some embodiments, geofeed streamer module 114 may receive the geofeed stream request from a geofeed widget that is included with online content such as a website and provide the geofeed widget with the geofeed stream to the geofeed widget. The geofeed widget may include instructions executing on the client such as, without limitation, Hypertext Markup Language, JAVASCRIPT instructions, and/or other client-executed instructions. The client-executed instructions may be stored at a memory of computer 110 and distributed to various entities that wish to embed a geofeed widget into their site. The client-executed instructions may be preconfigured such that the geofeed widget operates when embedded at the client site and/or be customizable at the client site.

The geofeed widget may specify in various ways a geofeed for which a geofeed stream is to be displayed. For example, the geofeed widget may include a geo-location specification, geofeed parameters, a geofeed identifier, a geofeed definition identifier, a geofeed definition, and/or other information that can be used to specify a geofeed for which a geofeed stream is to be displayed by the geofeed widget.

In some embodiments, geofeed streamer module 114 may be configured to participate in a communication channel with the geofeed widget and provide the geofeed stream to the geofeed widget based on the request. For example, when the geofeed widget is embedded into an online article published by a news website in relation to a particular city, geofeed streamer module 114 may communicate the geofeed stream to the geofeed widget, which displays the geofeed stream alongside the online article where the geofeed widget is embedded.

In some embodiments, geofeed streamer module 114 may be configured to periodically or continuously refresh the geofeed stream with newly added geofeed content so that the geofeed stream remains up-to-date with real-time content. For example, the geofeed streamer module may obtain content that is relevant to a geographically definable location that was newly published or otherwise newly made available by content providers since the last time that the geofeed streamer module requested such content from the content providers. In some embodiments, only geofeed content that was newly added since the most recent refresh occurred is included in the geofeed stream. In some embodiments, at least a portion of new and previous geofeed content is included in the geofeed stream.

In some embodiments, geofeed streamer module 114 may initiate the geofeed stream by obtaining geofeed content for a geofeed and including the geofeed content in the geofeed stream. In some embodiments, the initial geofeed stream may be limited to particular time range (e.g., geofeeds within the last week), a particular maximum number of geofeeds to display, the most recent geofeed content, and/or other filter by which to limit the number of geofeed content items for the initial geofeed stream. Future geofeed stream refreshes may occur periodically at time intervals since the prior refresh (or since the initialization of the geofeed stream), periodically based on a number of new geofeed content items since the last refresh (e.g., update each time a particular number of new geofeed content items is available), and/or other instances where the geofeed stream may be refreshed.

In some embodiments, geofeed streamer module 114 may receive geofeed stream preferences that control a format preference (e.g., font styles, font sizes, photo sizes, etc.), filters used to filter in or out certain content (e.g., whether to show only photos, only content from particular providers, etc.), maximum numbers of content to show at any time, and/or other preferences that can be used to control operation of the geofeed widget. For example, an administrator of a site that embeds a geofeed widget may wish to moderate content that appears in the geofeed widget. Geofeed streamer module 114 may receive such preferences via moderator tools displayed by user interface module 118, preferences communicated from the geofeed widget, from user profile database 132, and/or other method of obtaining such preferences.

In some embodiments, curator module 115 may be configured to curate and manage geofeed content. The curator module may label certain geofeed content within a geofeed with various collection identifiers that classify the geofeed content to create geofeed collections. Curator module 115 may receive collection identifiers from a user to allow the user to label certain geofeed content. In some embodiments, the curator module may use the collection identifiers to selectively display the labeled content. A user may view a geofeed and label particular geofeed content of the geofeed with a collection identifier that allows the user to later recall the geofeed content based on the collection identifier. For example, curator module 115 may allow a user to create a collection of geofeed content based on a particular topic such as "NASCAR." In this manner, the user may later recall NASCAR-related geofeed content. In some embodiments, the collections may be communicated in a manner similar to the manner in which geofeeds may be communicated and shared.

In some embodiments, curator module 115 may be configured to generate a single geofeed collection that spans multiple geo-locations, and/or geofeeds. For example, a collection related to geofeed content associated with a baseball team may include geofeed content from geo-locations and/or geofeeds associated with different cities/stadiums in which the baseball team has played.

In some embodiments, curator module 115 may be configured to generate multiple collections based on a single geo-location and/or geofeed. For example, a geo-location and/or geofeed associated with a single stadium may be associated with individual collections each curated to include geofeed content that correspond to different topics such as different innings of a game, different fans (e.g., home-team fans vs. visiting-team fans), and/or other topics.

In some embodiments, the administration module 116 may be configured to manage user accounts, set user roles such as security access roles, and/or perform other administrative operations. For example, the administration module may be used to set which user may access different views, curate geofeeds, view and manage curated content, decide whether to burn a geofeed, and/or set other security roles.

In some embodiments, the communication module 117 may be configured to share a geofeed via a content provider such as a social media provider, email, SMS text, and/or other communication channels. In some embodiments, the communication module may be configured to communicate a geofeed via various feeds such as Really Simple Syndication ("RSS") and ATOM feeds, a vanity Uniform Resource Locator ("URL") using a name of the geofeed (e.g., a name assigned by the content consumer), and/or other communication channels.

In some embodiments, the user interface module 118 may be configured to generate user interfaces that allow viewing and interaction with the geofeeds. For example, the user interface module may present various displays for curating geofeeds, displaying geofeeds, requesting geofeeds, and/or otherwise displaying geofeed information.

Those having skill in the art will recognize that computer 110 and content consumer device 130 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or consumer device 130. In one implementation, computer 110 and consumer device 130 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
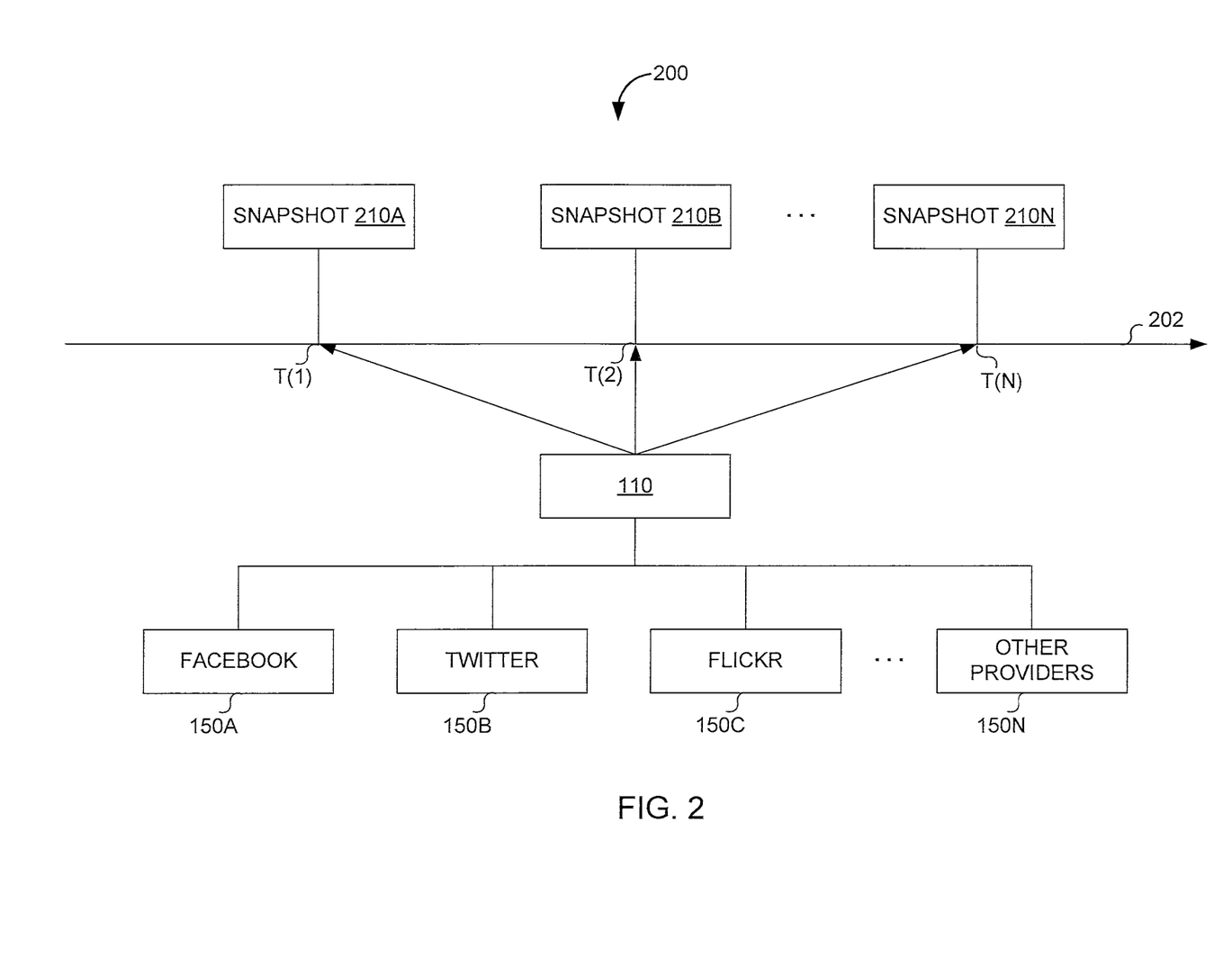
FIG. 2 illustrates a schematic diagram of geofeed snapshots, according to an aspect of the invention.

FIG. 2 illustrates a schematic diagram 200 of generating geofeed snapshots, according to an aspect of the invention. In an embodiment, at different times (T(1), T(2), ..., T(N)) of a hypothetical timeline 202, computer 110 may aggregate content that is relevant to one or more geo-locations from a plurality of content providers 150 based on requests formatted specifically for individual ones of the content providers to generate snapshots 210 (illustrated in FIG. 2 as snapshot 210A, 210B, ..., 210N). For example, at time T(1), computer 110 may generate a snapshot 210A that includes the content aggregated from content providers 150 at time T(1) and store snapshot 210A. Similarly, at time T(2), computer 110 may generate a snapshot 210B that includes the content aggregated from content providers 150 at time T(2) and store snapshot 210B. At other times T(N), computer 110 may generate other snapshots 210N that includes the content aggregated from content providers 150 at times T(N) and store snapshots 210N.

Figure 3:
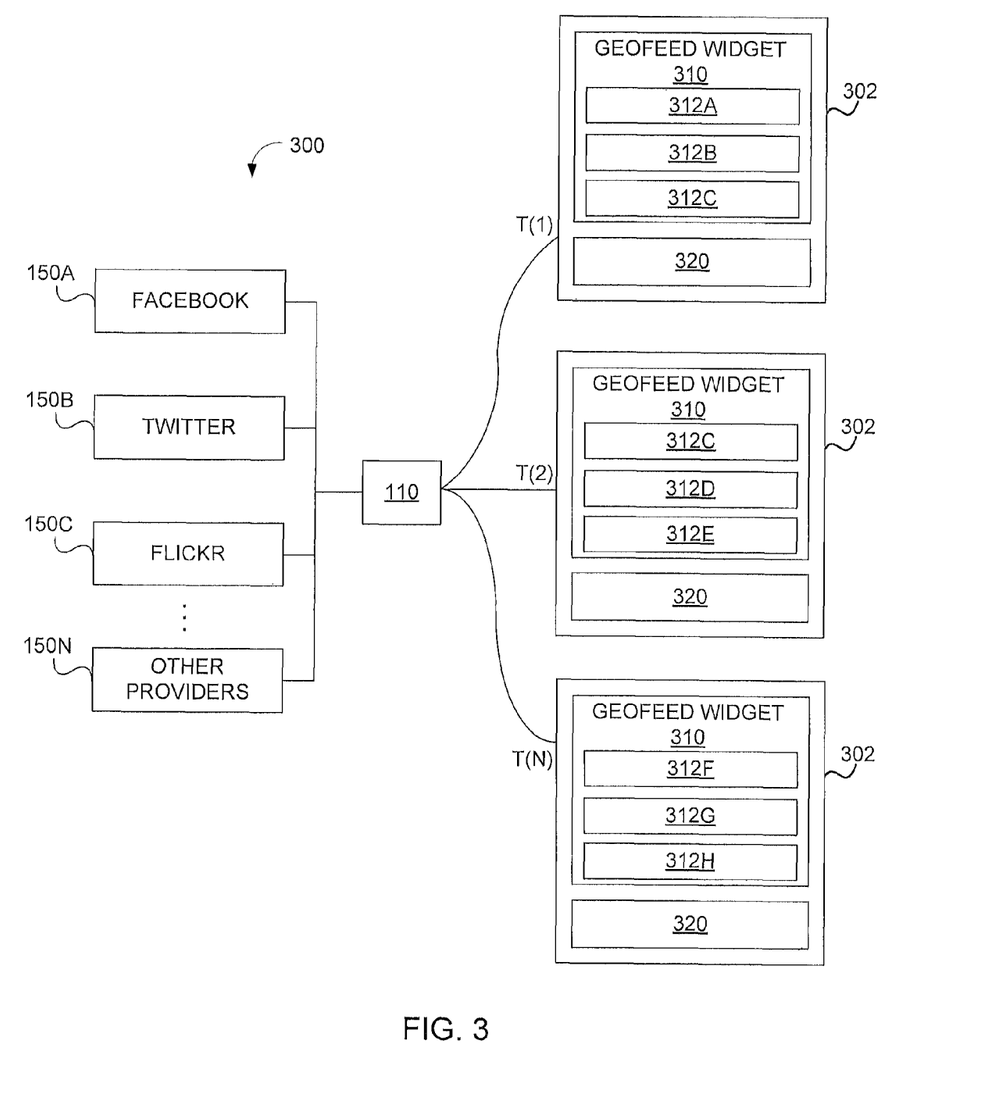
FIG. 3 illustrates a schematic diagram of geofeed streaming content, according to an aspect of the invention.

FIG. 3 illustrates a schematic diagram 300 of geofeed streaming content, according to an aspect of the invention. In an embodiment, at different times (T(1), T(2), ..., T(N)), computer 110 may aggregate content from a plurality of content providers 150 based on requests formatted specifically for individual ones of the content providers and one or more geo-locations to obtain newly available content 312 (illustrated in FIG. 3 as newly available content 312A-H) from the content providers. An interface 302 may have embedded a geofeed widget 310 that receives the newly available content 312 at the different times and displays the geofeed widget alongside other content 320. In a non-limiting example, interface 302 may include an online news article 320 of a news provider and geofeed widget 310 may include newly available content 312 that is relevant to a geo-location for which the news article relates. In particular, a news story related to a particular city may include a geofeed widget that includes newly available geofeed content related to the particular city in order to augment the story with real-time content related to the city. Other uses of geofeed widget 310 will be apparent as well.

In some embodiments, geofeed widget 310 may include overlapping content from one time to the next. For example, as illustrated, geofeed widget 310 includes content 312C at both times T(1) and T(2). In some embodiments, geofeed widget 310 includes only content that has not yet been previously displayed. For example, as illustrated, geofeed widget 310 at time T(N) includes content 312F-H that were not previously presented at times T(1) and T(2).

In some embodiments, computer 110 obtains content 312 that is newly available since a time of last refresh. For example, at time T(1), content 312 that is newly available since a predefined initial time may be aggregated from content providers 150. At time T(2), content 312 that is newly available since time T(1) may be aggregated from content providers 150 for updating geofeed widget 310. Similarly, at time T(N), content 312 that is newly available since time T(2) may be aggregated from content providers 150 for updating geofeed widget 310. In this manner, geofeed widget 310 may display a real-time geofeed stream.

Figure 4:
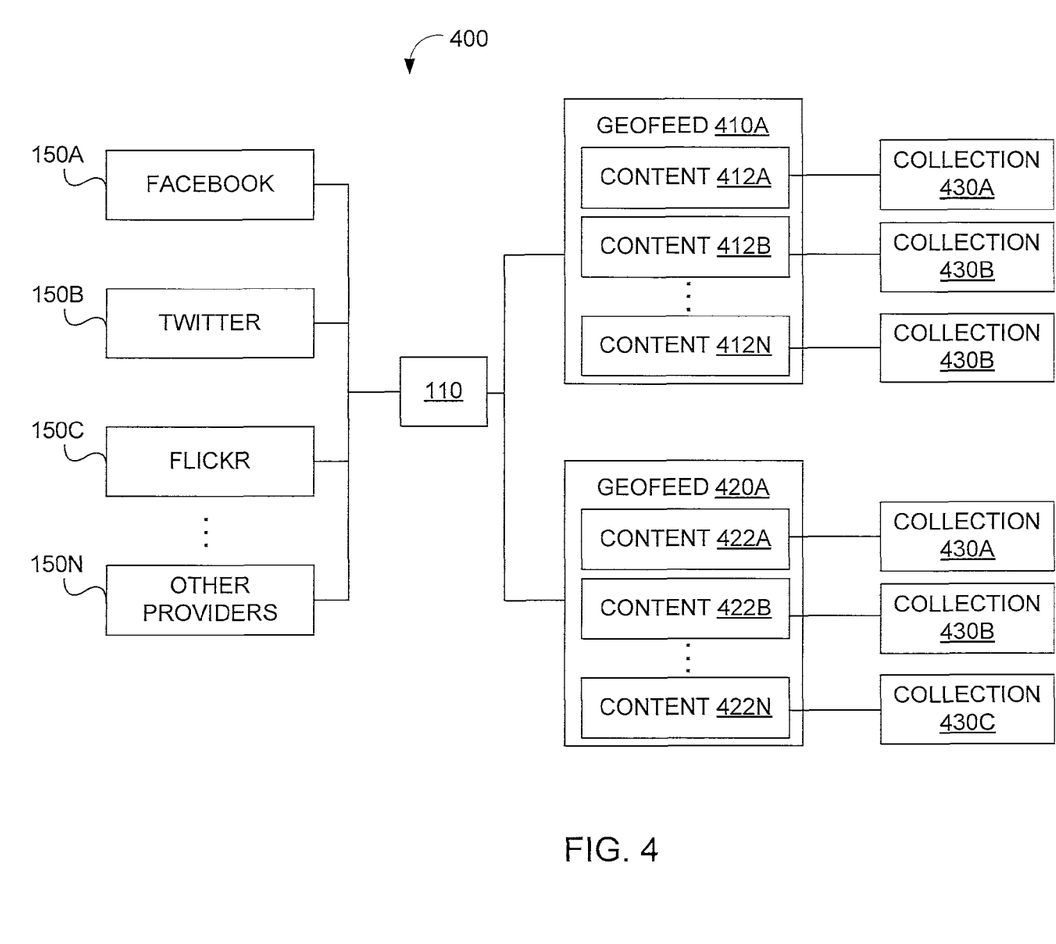
FIG. 4 illustrates a schematic diagram of curating geofeed content into collections, according to an aspect of the invention.

FIG. 4 illustrates a schematic diagram 400 of curating geofeed content into collections, according to an aspect of the invention. In an embodiment, computer 110 may aggregate content (illustrated in FIG. 4 as content 412A, 412B, ..., 412N and content 422A, 422B, ..., 422N) that is relevant to one or more geo-locations from a plurality of content providers 150 based on requests formatted specifically for individual ones of the content providers to generate geofeeds (illustrated in FIG. 4 as geofeeds 410 and 420). Computer 110 may receive collection identifiers 430 (illustrated in FIG. 4 as collection identifiers 430A, 430B, 430C) to be associated with one or more of the geofeed content 412, 422. A collection 430 may be used to curate geofeed content 412, 422 based on common themes, types of content, keywords, and/or other curations. In this manner, users may be able to curate geofeeds in order to save or highlight certain geofeed content.

In some embodiments, a single geofeed may include geofeed content that is curated to belong to more than one collection. For example, as illustrated, geofeed 410 includes content 412A that is curated into collection 430A and content 412B, 412N that are curated into collection 430B. In this manner, a single geofeed may include content that is curated into multiple different collections.

In some embodiments, content from different geofeeds may be curated into a single collection. For example, as illustrated, geofeed 420 includes content 422A that is curated into collection 430A (along with content 412A from geofeed 410A). In this manner, geofeed content from more than one geofeed may be curated into a single geofeed.

Figure 5:
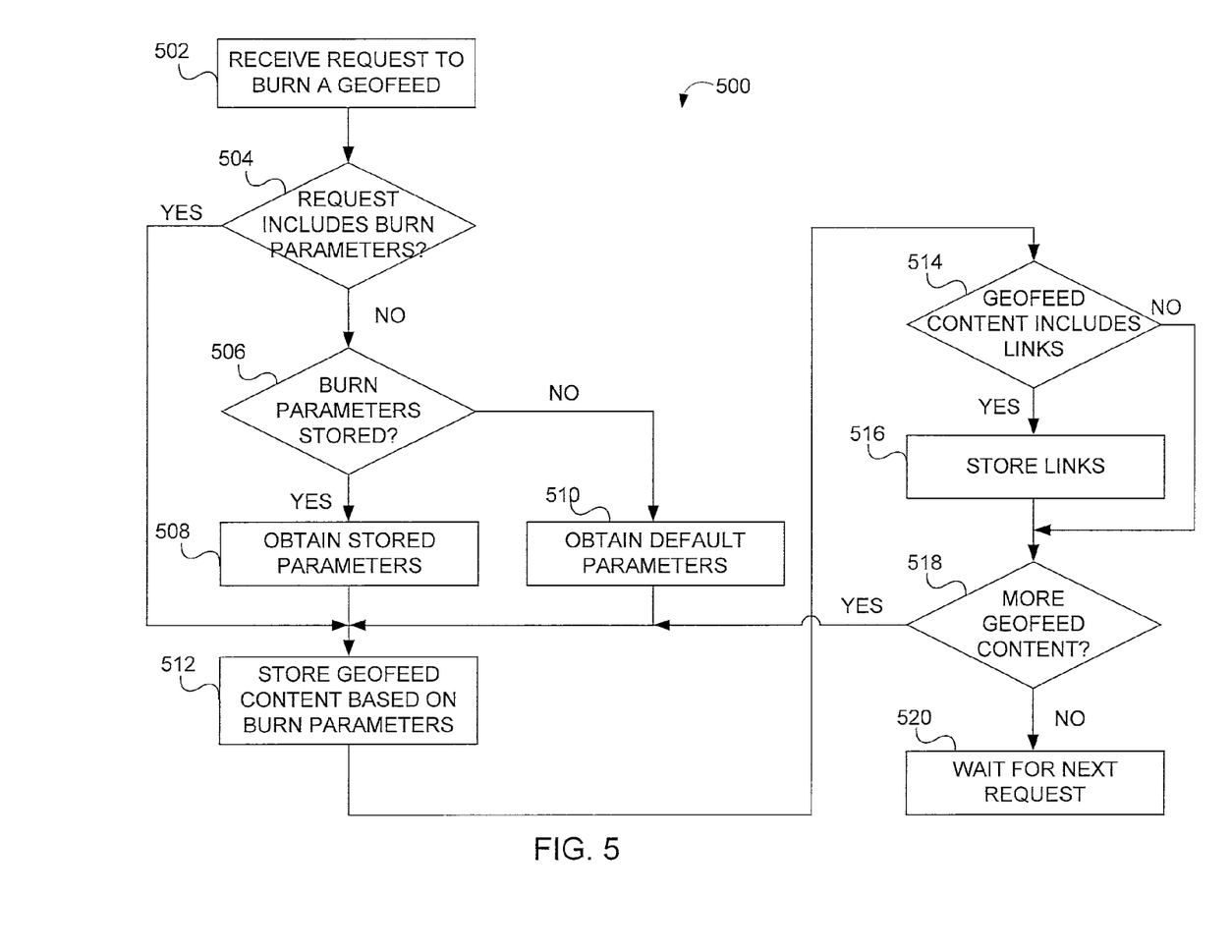
FIG. 5 illustrates a process of burning a geofeed, according to an aspect of the invention.

FIG. 5 illustrates a process 500 of burning a geofeed, according to an aspect of the invention. The various processing operations and/or data flows depicted in FIG. 5 (and in the other drawing figures) are described in greater detail herein. The described operations may be accomplished using some or all of the system components described in detail above and, in some embodiments, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, a request to burn a geofeed may be received. The request may include a request to burn an existing geofeed or a request to create a geofeed and then burn the created geofeed. The request may originate from a user, an automated process (such as a nightly or other automated process), and/or other origin.

In some embodiments, the request may include one or more burn parameters that may identify information to be burned. As such, in an operation 504, a determination of whether the request includes burn parameters may be made. If the request does not include burn parameters, a determination of whether burn parameters are stored in a database may be made in an operation 506. If burn parameters have been stored, the stored burn parameters may be obtained in an operation 508. For example, a user may have provided preferences that include preferred burn parameters that are stored in a database such as user profile database 132. If burn parameters have not been stored, default burn parameters may be obtained in an operation 510. In some embodiments, default burn parameters may include hard-coded burn parameters that are not necessarily obtained from a database.

Regardless of the source of the burn parameters, in an operation 512, aspects of geofeed content and/or geofeed content of the geofeed to be burned may be stored in a memory such as geofeed database 136. The aspects of geofeed content and/or geofeed content that is stored may represent a burned geofeed.

In an operation 514, a determination of whether the geofeed content includes one or more links such as URL to other content may be made. If the geofeed content includes one or more links, the one or more links may be parsed from the geofeed content and stored in an operation 516. In an operation 518, a determination of whether more geofeed content is to be stored may be made. If more geofeed content is to be stored, processing may return to operation 512. If no more geofeed content is to be stored, in an operation 520, processing may wait for the next request to burn a geofeed.

In some embodiments, a burned geofeed may be associated with a burn date, or a date in which the geofeed was burned. In this manner, the system and content consumers may be able to view when the geofeed was burned and/or obtain a burned geofeed based on the burn date.

Figure 6:
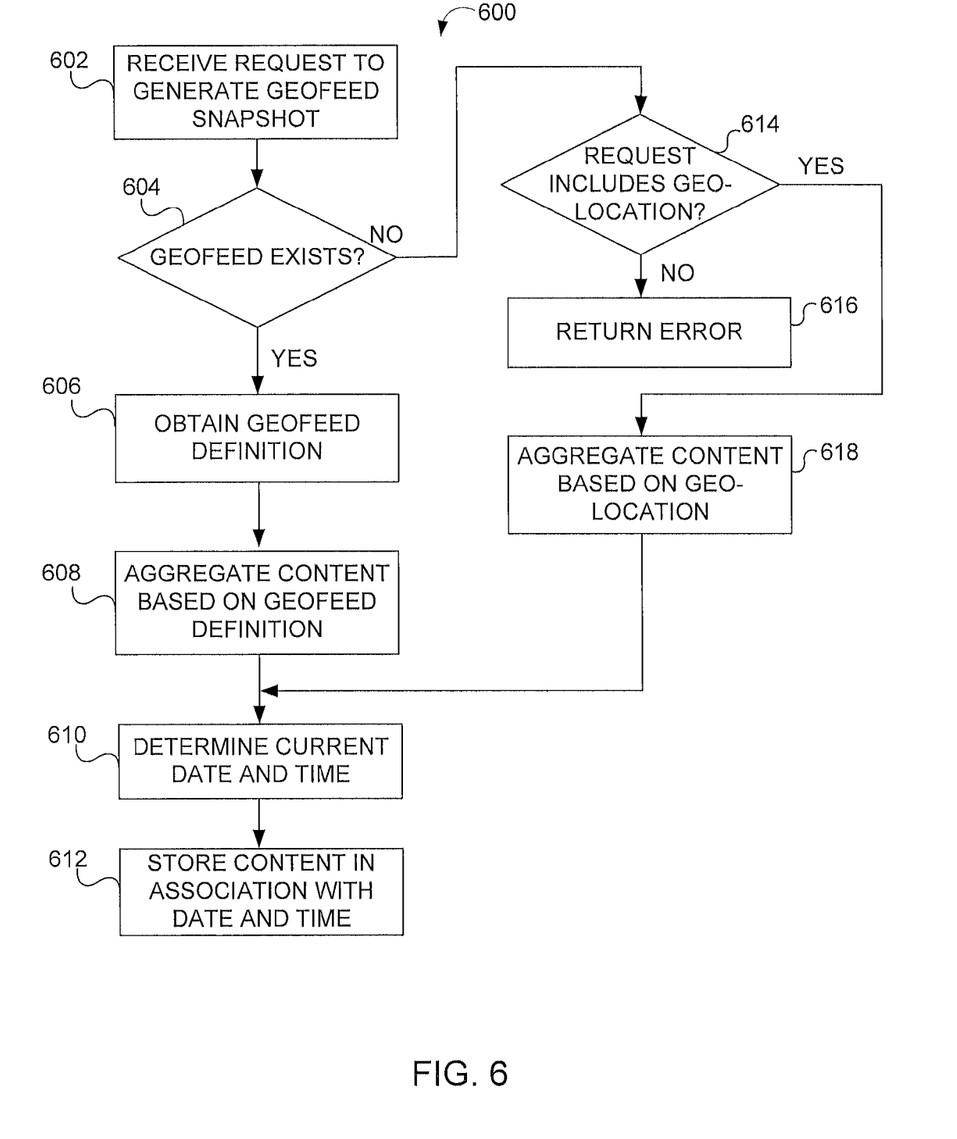
FIG. 6 illustrates a process of generating a geofeed snapshot, according to an aspect of the invention.

FIG. 6 illustrates a process 600 of generating a geofeed snapshot, according to an aspect of the invention. In an operation 602, a request to generate a snapshot may be received. The request may include a request to generate a snapshot for an existing geofeed or a request to create a geofeed and then generate a snapshot for the created geofeed. The request may originate from a user, an automated process (such as a nightly or other automated process), and/or other origin.

In an operation 604, a determination of whether the geofeed exists for which a snapshot is to be generated may be made. If a geofeed for which the snapshot is to be generated already exists, a geofeed definition that specifies the geofeed may be obtained in an operation 606. In an operation 608, content may be aggregated from various content providers based on the geofeed definition and requests formatted specifically for individual ones of the content providers.

Returning to operation 604, if a geofeed for which the snapshot is to be generated does not exist, a determination of whether the request includes a geo-location may be made in an operation 614. If the request does not include a geo-location, an error may be returned in an operation 616. If the request includes a geo-location in an operation 618, content may be aggregated from various content providers based on requests that are formatted specifically for individual ones of the content providers and specify the geo-location. In some embodiments, the request may include one or more geofeed parameters that specify information to include and/or exclude from the aggregated content. For example, the geofeed parameters may be formatted and provided to the content providers who filter in and/or out content. The geofeed parameters may be used by process 600 to filter in and/or out content received from the content providers.

In an operation 610, a current date and/or time may be determined. In an operation 612, the aggregated content may be stored in a memory such as geofeed database 136 in association with the date and/or time. In some embodiments, process 600 may be iterated at a later time such as at regular intervals so that multiple snapshots of a geofeed is generated at different times.

Figure 7:
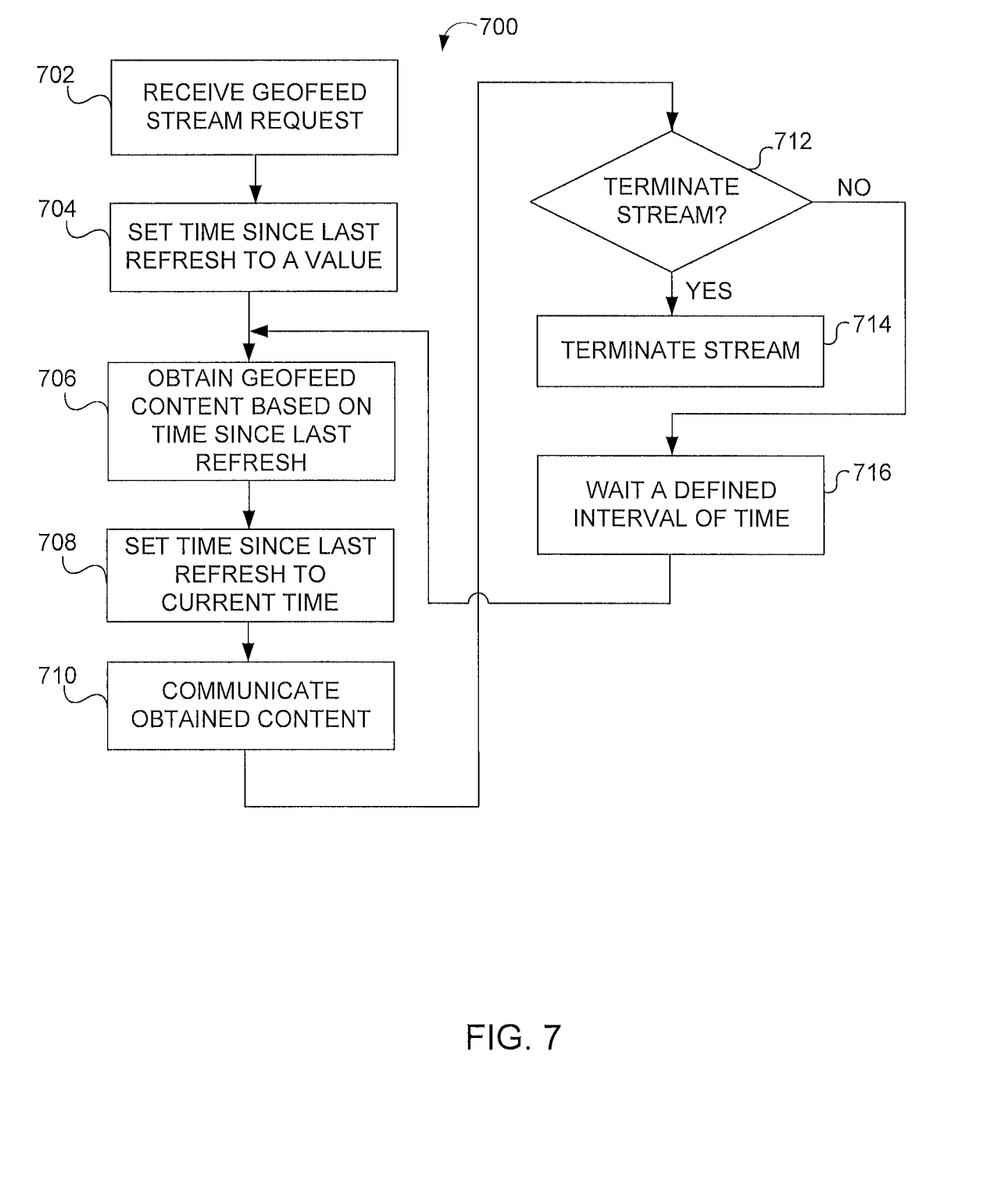
FIG. 7 illustrates a process of streaming a geofeed, according to an aspect of the invention.

FIG. 7 illustrates a process 700 of streaming a geofeed, according to an aspect of the invention. In an operation 702, a request for a geofeed stream may be received. The request may include a request to stream an existing geofeed or a request to create a geofeed and then stream the created geofeed. The request may originate from a user, an automated process (such as a nightly or other automated process), and/or other origin. In some embodiments, the request may originate from a geofeed widget executing at a remote computer such as content consumer device 130. The geofeed widget may be included within an interface so that the geofeed stream may be provided alongside or within the interface. For example, the geofeed widget may be inserted into a webpage where the geofeed stream may be embedded. Other examples such as a mobile application interface in which the geofeed widget is inserted may be used as well. In some instances, the geofeed widget may not be embedded with other content but rather be configured as a standalone application.

Regardless of the particular implementation of where or how the geofeed widget is implemented, in an operation 704, a time since last refresh variable may be set to a particular value. The particular value may specify a time filter by which to obtain geofeed content to be streamed. For example, the geofeed stream may be real-time such that only recently available content is streamed. The particular value may be predefined and/or configurable.

In an operation 706, geofeed content that is relevant to one or more geo-locations may be aggregated from various content providers based on requests formatted specifically for individual ones of the content providers and based on the time since last refresh. In some embodiments, all content from the content providers may be aggregated and later filtered based on the time since last refresh. In some embodiments, the requests to the content providers may include the time since last refresh such that only content that satisfies the time since last refresh value is provided by the content providers. In some embodiments, one provider may support the use of the time since last refresh value to filter content while another provider may not. In these embodiments, a combination of including the time since last refresh value in the request for providers that support the value and filtering after content is received for providers that do not support the value may be used.

In some embodiments, the geofeed stream request and/or a memory may include moderator settings for the geofeed stream. The moderator settings may filter in and/or out certain content that should/should not appear in the geofeed stream. For example, images may be excluded from the geofeed stream while text may be included into the geofeed stream. In some embodiments, one or more geofeed parameters may be used to filter in and/or out content for the geofeed stream.

In an operation 708, the time since last refresh may be set to the current time. In an operation 710, the aggregated content may be communicated. For example, the aggregated content when communicated represents the geofeed stream. In some embodiments, only newly available content is communicated to, for example, the geofeed widget. In some embodiments, an updated geofeed stream is generated and communicated to the geofeed widget.

In an operation 712, a determination of whether to terminate the geofeed stream may be made. For example, the geofeed stream may be terminated in an operation 714 when process 700 is no longer in communication with the geofeed widget such as when a user navigates away from a webpage that includes the geofeed widget and/or an instruction to terminate the geofeed stream is received.

In an operation 716, when the geofeed stream should not be terminated, process 700 may wait a defined interval of time. The defined interval of time specifies how often the geofeed stream should be updated (e.g., when content should be aggregated from the content providers). The interval of time may be predefined and/or configurable. After the interval of time has elapsed, process 700 may return to operation 706, where geofeed content that is newly available since the last refresh may be obtained.

Figure 8:
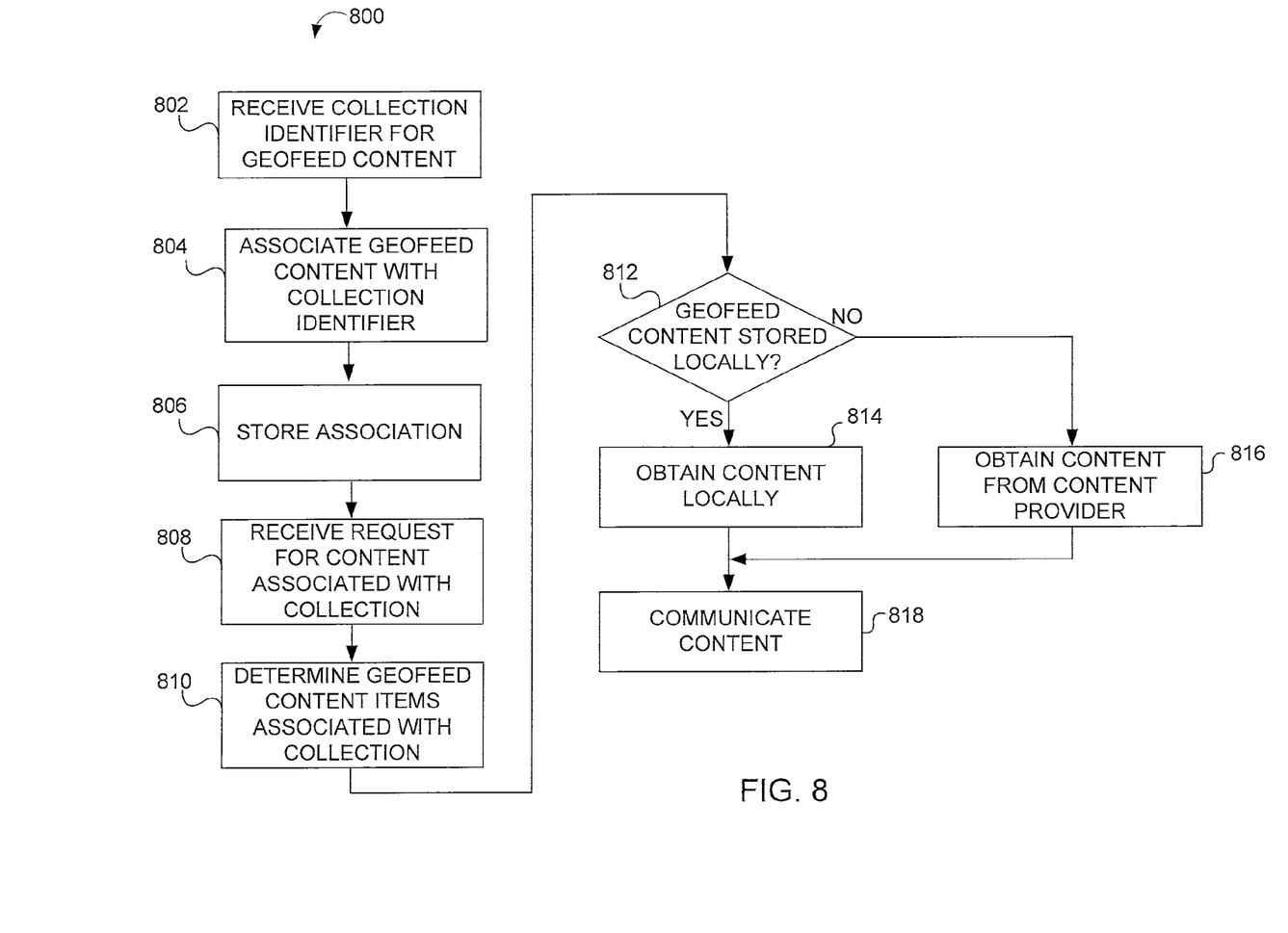
FIG. 8 illustrates a process of curating geofeeds into collections, according to an aspect of the invention.

FIG. 8 illustrates a process 800 of curating geofeeds into collections, according to an aspect of the invention. In an operation 802, a collection identifier for one or more geofeed content items may be received. For example, a user viewing a geofeed may tag a particular geofeed content item (e.g., individual social media content and/or other content) with a collection name or other identifier. A geofeed content item may be stored locally using a local identifier and/or may be obtained from a content provider using an external identifier provided by the content provider.

In an operation 804, the one or more geofeed content items may be associated with the collection identifier. For example, the local identifier and/or the external identifier may be associated with the collection identifier. In an operation 806, the association between the one or more geofeed content items and the collection identifier may be stored in a memory such as geofeed database 136.

In an operation 808, a request to view a collection of geofeed content identified by the collection identifier may be received. In an operation 810, the one or more content items associated with the collection identifier may be determined. In an operation 812, a determination of whether the one or more geofeed content items are stored locally may be made. In an operation 814, the one or more geofeed content items may be obtained from the local memory. For example, a geofeed content item may be retrieved based on a local identifier. In an operation 816, the one or more geofeed content items may be obtained from a content provider. For example, a geofeed content item may be obtained from the content provider based on a request to the content provider that includes an external identifier provided by the content provider when the content was originally provided. In an operation 818, the one or more geofeed content items may be communicated via one or more communication channels.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for providing a geofeed stream, the system comprising:
one or more processors configured to execute one or more computer program modules, the one or more computer program modules comprising:
a geofeed streamer module configured to:
receive a request for a geofeed stream that includes real-time updates of geofeed content items that are relevant to one or more geographically definable locations and aggregated from a plurality of content providers based on requests formatted specifically for individual ones of the plurality of content providers;
obtain a first geofeed content item that is available at a first time, wherein the first geofeed content item is relevant to the one or more geographically definable locations and is aggregated from at least a first one of the plurality of content providers;
generate the geofeed stream that includes the first geofeed content item as at least part of the geofeed stream;
cause the geofeed stream to be communicated;
obtain a second geofeed content item that is available at a second time after the first time but unavailable at the first time, wherein the second geofeed content item is relevant to the one or more geographically definable locations and is aggregated from the first one of the plurality of content providers or a second one of the plurality of content providers; and
cause the second geofeed content item to be communicated such that the geofeed stream is updated with the second geofeed content item.

2. The system of claim 1, wherein the second geofeed content items is aggregated from the second one of the plurality of content providers different from the first one of the plurality of content providers.

3. The system of claim 1, wherein the geofeed streamer module is further configured to:
generate a first request formatted specifically for the first content provider, the request comprising a specification of the one or more geographically definable locations and a time since last refresh value, wherein the time since last refresh value specifies that content that was available before the time since last refresh value should not be provided; and
obtain the first geofeed content item from the first one of the plurality of content providers based on the first request.

4. The system of claim 1, wherein the geofeed streamer module is further configured to:
generate a plurality of requests formatted specifically for individual ones of the plurality of content providers, each request comprising a specification of the one or more geographically definable locations;
aggregate a plurality of geofeed content items from the plurality of content providers based on the plurality of requests;
obtain a time since last refresh value, wherein the time since last refresh value specifies that content that was available before the time since last refresh value should not be included in the geofeed stream;
filter the plurality of geofeed content items based on the time since last refresh value; and
obtain the first geofeed content item based on the filtered plurality of geofeed content items.

5. The system of claim 1, wherein the geofeed streamer module is further configured to:
set the first time to a time since last refresh value, wherein the time since last refresh value specifies that content that was available before the time since last refresh value should not be included in the geofeed stream;
obtain the second geofeed content item based on the time since last refresh value.

6. The system of claim 1, wherein the geofeed streamer module is further configured to:
iteratively obtain additional geofeed content items at intervals from the plurality of content providers; and
cause the additional geofeed content items to be communicated to update the geofeed stream.

7. The system of claim 6, wherein the geofeed streamer module is further configured to:

filter the additional geofeed content items based on geofeed stream preferences used to filter in or out content from the additional geofeed content items for inclusion in the geofeed stream.

8. The system of claim 1, wherein the geofeed stream and the updated geofeed stream share at least one geofeed content item in common.

9. The system of claim 1, wherein the geofeed stream and the updated geofeed stream include different geofeed content items.

10. A system of burning a geofeed, the system comprising:
one or more processors configured to execute one or more computer program modules, the one or more computer program modules comprising:
an archive module configured to:
receive a request to burn a geofeed, the geofeed comprising a plurality of geofeed content items that are relevant to one or more geographically definable locations and aggregated from a plurality of content providers based on requests formatted specifically for individual ones of the plurality of content providers;
obtain at least a first one of the plurality of geofeed content items, wherein the first geofeed content item that is relevant to the one or more geographically definable locations;
store one or more aspects of the first one of the plurality of geofeed content items in response to the request to burn the geofeed; and
cause the one or more aspects of the first one of the plurality of geofeed content items to be provided.

11. The system of claim 10, wherein the one or more aspects comprise the first one of the plurality of geofeed content items or information that describes the first one of the plurality of geofeed content items.

12. The system of claim 10, wherein the one or more aspects comprises one or more links to other content included in the first one of the plurality of geofeed content items, the archive module further configured to:
parse the first one of the plurality of geofeed content items;
obtain the one or more links to other content based on the parse;
store the one or more links; and
cause the one or more links to be provided.

13. The system of claim 10, wherein the one or more aspects comprise raw content from a first one of the plurality of content providers that provided the first one of the plurality of geofeed content items.

14. The system of claim 10, wherein the archive module is further configured to:
obtain one or more burn parameters that specify the one or more aspects to be stored when the geofeed is burned; and
store the one or more aspects of the first one of the plurality of geofeed content items based on the one or more burn parameters.

15. The system of claim 10, wherein the archive module is further configured to:
receive a request to access at least a portion of the geofeed;
cause the one or more aspects of the first one of the plurality of geofeed content items to be provided based on the request for the geofeed.

16. The system of claim 10, wherein the archive module is further configured to:
receive a request to access at least a portion of a second geofeed that is related to a second one more geographically definable locations that is at least partially coextensive with the one or more geographically definable locations; and
cause the one or more aspects of the first one of the plurality of geofeed content items to be provided based on the request for the second geofeed.

17. A system of curating geofeed content into one or more collections, the system comprising:
one or more processors configured to execute computer program modules, the computer program modules comprising:
a curator module configured to:
receive a first collection identifier to be associated with a first geofeed content item of a first geofeed and a geofeed content item of the first geofeed, wherein the first geofeed includes a plurality of geofeed content items are relevant to one or more geographically definable locations and aggregated from a plurality of content providers based on requests formatted specifically for individual ones of the plurality of content providers;
store an association of the first collection identifier with the first geofeed content item and an association of the first collection identifier with the second geofeed content item;
receive a request for a first collection identified by the first collection identifier;
obtain the first geofeed content item and the second geofeed content item based on the request for the first collection; and
cause the first geofeed content item and the second geofeed content item to be provided based on the first collection identified by the first collection identifier.

18. The system of claim 17, wherein the curator module is further configured to:
receive a second collection identifier to be associated with a third geofeed content item of the first geofeed;
store an association of the second collection identifier with the third geofeed content item;
receive a request for a second collection identified by the second collection identifier;
obtain the third geofeed content item based on the request for the second collection; and
cause the third geofeed content item to be provided based on the second collection identified by the second collection identifier.

19. The system of claim 17, wherein the curator module is further configured to:
receive the first collection identifier to be associated with a fourth geofeed content item of a second geofeed, wherein the second geofeed includes a plurality of geofeed content items are relevant to one or more second geographically definable locations that are different from the one or more geographically definable locations and aggregated from the plurality of content providers based on the requests formatted specifically for individual ones of the plurality of content providers;
store an association of the first collection identifier with the fourth geofeed content item of the second geofeed; and
further obtain the fourth geofeed content item; and
further cause the fourth geofeed content item to be provided based on the first collection identified by the first collection identifier.

20. The system of claim 17, wherein the curator module is further configured to:
obtain the first geofeed content item locally.

21. The system of claim 17, wherein the curator module is further configured to:
   generate a request formatted specifically for a first one of the plurality of content providers that provided the first geofeed content item; and
   obtain the first geofeed content item from the first one of the plurality of content providers.

* * * * *